(12) United States Patent
Hiscock et al.

(10) Patent No.: US 6,181,681 B1
(45) Date of Patent: Jan. 30, 2001

(54) LOCAL AREA NETWORK MEDIA ACCESS CONTROLLER LAYER BRIDGE

(75) Inventors: James Scott Hiscock, Rockport; Norman Stephen Schwartz, Hopkinton; Douglas C. Caswell, Sudbury, all of MA (US)

(73) Assignee: 3COM Corporation, Santa Clara, CA (US)

( * ) Notice: Under 35 U.S.C. 154(b), the term of this patent shall be extended for 0 days.

(21) Appl. No.: 08/999,482

(22) Filed: Dec. 29, 1997

(51) Int. Cl.[7] ....................................... H04B 7/14
(52) U.S. Cl. ............................. 370/279; 370/327
(58) Field of Search ........................ 370/279, 285, 370/286, 290, 293, 327, 352, 398, 396, 401, 402, 408, 412, 423, 422, 434, 429

(56) References Cited

U.S. PATENT DOCUMENTS

| 5,396,493 | 3/1995 | Sugiyama | 370/60 |
|---|---|---|---|
| 5,812,792 | * 9/1998 | Haddock et al. | 395/200.79 |
| 5,857,075 | * 1/1999 | Chung | 395/200.53 |

FOREIGN PATENT DOCUMENTS

| 2268376 | 1/1994 | (GB) . |
|---|---|---|
| 2323258 | 9/1998 | (GB) . |

* cited by examiner

Primary Examiner—Valencia Martin-Wallace
Assistant Examiner—Kim T. Nguyen
(74) Attorney, Agent, or Firm—McGlew and Tuttle, P.C.

(57) ABSTRACT

A device, system and method for a LAN is disclosed. The device includes a plurality of ports to connect to units such as host end user units. Each of the ports is connected to arbiter/aggregation device. The arbiter/aggregator device is connected to a high speed trunk for moving data packets from the various hosts to an output (the upstream or next layer switch). An input is provided connected to a high speed egress trunk. Each of the ports is connected to the high speed egress trunk via a filter for filtering data packets received via the high speed egress trunk. Packets are either allowed to pass through the filter (forwarded) or they are filtered (stopped at the filter).

10 Claims, 7 Drawing Sheets

LOCAL AREA NETWORK MEDIA ACCESS CONTROLLER LAYER BRIDGE

FIELD OF THE INVENTION

The present invention relates to computer networks in general and more particularly to a media access controller layer bridges/switches for local area networks (LANs).

BACKGROUND OF THE INVENTION

Hierarchial wiring structures are now commonly provided in modern local area network installations. Such structures include various different levels to provide a fanning out of the network from a centralized core. Client-server computing technologies drive this type of structure. High speed servers are commonly located at a central switch. The client end-user hosts are located in a manner similar to "leaves" of the tree. Fully functional switches (or bridges) are for the most part deployed at the various levels to provide the fanning out of the network from the centralized core.

A traditional media access control (MAC)—layer bridge treats all ports as equal peers. Such a bridge is based on for example two shared segments wherein the bridge considers if packets should be transferred from one segment to the other segment. The bridge assumes that each port is connected to one of the shared LAN segments. The segments consist of more than one end station or host. The bridge performs local-packet filtering (also known as bridge filtering). The bridge forwards packets to the appropriate destination port based on the address table entries. Every packet entering a bridge must have a source plus destination addresses. The source and destination addresses are interrogated based on a table. The use of such a table for looking up destination addresses and/or source address is very central processing unit (CPU) intensive or requires complex application specific integrated circuits (ASICs).

Switches are known which provide the connection of additional or multiple ports to a bridge (greater than the two segments as discussed above). Instead of considering this a bridge connecting two segments, such a multiple port device may also be referred to as a switch. With such a bridge/switch it is possible to connect a single host to each bridge port. In such an arrangement, the segments are not all shared as various hosts are connected to various different ports of the switch.

With such a switch, all ports remain equal and traffic is more or less still distributed. With the inclusion of a server connected to a port of the switch, some level of unidirectional traffic flow (data packet flow) is possible. All bridge functions remain intact with this type of bridge/switch and these functions are required for this flat wiring scheme.

The basic bridge connecting two segments and the switch connecting a segment and multiple ports (including single host ports and server ports) is the basis for known hierarchial wiring structures. With such a hierarchial implementation, various switching levels provide a fanning out of the network from a centralized core. The centralized core may be considered level 0 with a switch which operates as the core. Next, several level 1 switches may be connected downstream from the core. Each level 1 switch operates as a feeder to the level 0 switch and interconnects multiple level two switches which are below the level 1 switch. The level two switches are the direct connection to the host, namely these provide the end user connectivity to the network. Level 2 switches exist at the edge (the leaves) of the network and have the greatest numbers due to the fan-out nature of the structure. With known hierarchial levels, the layer 0 switch somewhat closely approximates the traditional bridge model, with peer-peer ports and distributed data flows being the norm. That is, various hosts share a segment connected to a port of the layer 0 switch. The CPU or ASIC provides the interrogation of the source and destination addresses via a table, to determine what segments to switch forwards packets to.

The layer 1 switch and the hierarchial structure is more of a feeder than a traditional bridge, although it maintains equivalent link speeds and is not optimized for unidirectional traffic. Further, each port of a level 1 switch is attached to a logically shared segment consisting of all downstream end stations, exactly as in the layer 0 switch.

The use of the layer 2 switch is the most divergent from the traditional bridging model. It is used acting virtually 100% as a traffic feeder with predictable upstream/downstream traffic flows. Each port is connected to only one end station so that each attached segment is not shared. The port speeds are asymmetric. End-station segments are at a speed of 10/100 Mbps and the uplink is at 1 Gbps. Although peer to peer traffic through the level 2 switch is possible, such peer to peer traffic is expected to be nominal or non-existent.

With such a level 2 switch in a hierarchial structure, the traditional any port—any port bridging model, with interrogation of destination address and source address via a table, is under-utilized. Most all of the ingress traffic flows upward toward the server. Virtually all ingress traffic flows down and out to the ports.

SUMMARY AND OBJECTS OF THE INVENTION

It is and object of the invention to provide a MAC layer packet forwarding device which melds the advantages of a repeater including low cost and observability and provides the additional control of a switch, including providing the degree of control as needed to send packets only where needed.

It is a further object of the invention to provide a switch useful for local area network applications which avoids the complexity of traditional bridges, particularly to provide a switch for lower levels of a hierarchial wiring arrangement (links fanning out from the central core) which switch provides advantages as to simplicity of operation as compared to bridges and which provides improved function as compared to traditional bridges.

According to the invention, a device is provided with a plurality of ports to connect to units such as host end user units. Each of the ports is connected to arbiter/aggregation means. The arbiter/aggregator means is connected to a high speed trunk for moving data packets from the various hosts to an output (the upstream or next layer switch). An input is provided connected to a high speed egress trunk. Each of the ports is connected to the high speed egress trunk via a filter for filtering data packets received via the high speed egress trunk. Packets are either allowed to pass through the filter (forwarded) or they are filtered (stopped at the filter).

According to a preferred form of the invention, the high speed ingress trunk and the high speed egress trunk are connected to local echo back means for echoing back or sending back packets which are directed to a host connected to a different one of the ports (a host connected to a port of the same device). This local echo back means sends back traffic (data packets) destined to be local (two hosts connected to ports of the same device), thereby allowing peer-peer traffic to occur. This echo back means may be provided at a port of an upstream switch of a hierarchial LAN implementation.

The present invention may be used with client-server computing technologies which drive hierarchial wiring structures with high-speed servers located at the central switch and client end-user hosts located at leaves of the tree. The invention is based on the understanding that in this type of environment, 99% of the data traffic is between the central server and the end leaves of the structure, and no segments are truly "shared" among hosts. That is, each host typically ties directly to a single switch port at a lower level (such as level 2 mentioned above). With this information in mind, a great deal of the traditional bridge functions are not required to support the 1% peer-peer traffic, namely traffic originated at a port of a device and going to a different port of the same device, which port is other than the connection to the central server.

With the device according to the invention and the method and system for operating a local area network hierarchial wiring structure, there is no ingress real-time address look-ups as in the ingress direction, traffic is aggregated and sent upstream (to a higher level). This provides a key savings as far as CPU time/ASIC complexity and provides a significant simplification.

According to the device system and method of the invention, there is no ingress local packet filtering as the packets are aggregated and packed onto a high speed truck for the next layer switch. With a single host per port arrangement, all traffic is forwarded.

According to the device, method and system of the invention, there is no specific direct support for peer-peer traffic. However, by the use of a local echo-back means, provided for example at a connection port of the next switch, peer-peer traffic is possible in a simple and economical manner.

According to the device, method and system of the invention there is no need for support for a spanning tree protocol. If the device only connects to end systems (not other bridge/switch/repeaters that forward traffic), then it is possible to create a loop. Specifically, the system preferably uses a connection of each port to a single host or single desktop end station only. The use of a smart multiplexing device according to the invention provides cost savings and an efficient single port, single host implementation.

The device, method and system of the invention provide simple egress filtering whereby one host/port only is the basis of this arrangement. Such a filtering forwards unicast traffic (data packets), multicast traffic as well as broadcasts and filters all.

It is a further object of the invention to provide a device which is less costly to implement than a true bridge due to a significant reduction in the need for real-time address processing, due to the reduced address table maintenance (aging/learning) and by eliminating per-port spanning tree features.

The invention provides three simplifications or reductions, namely:

1. No destination address lookup is needed for traffic from client ports to uplink port;

2. No source address lookup is needed for traffic from uplink port to client ports; and 3. No processing of spanning tree protocol frames.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Referring to the drawings in particular, the invention comprises a device for connection between the plurality of hosts H and one or more server S. The primary feature of the invention is the provision of a MAC layer packet forwarding device or smart multiplexing device 10. The smart multiplexing device or smart mux device 10 is preferably used in a hierarchial implementation as shown in FIG. 1.

Figure 1:
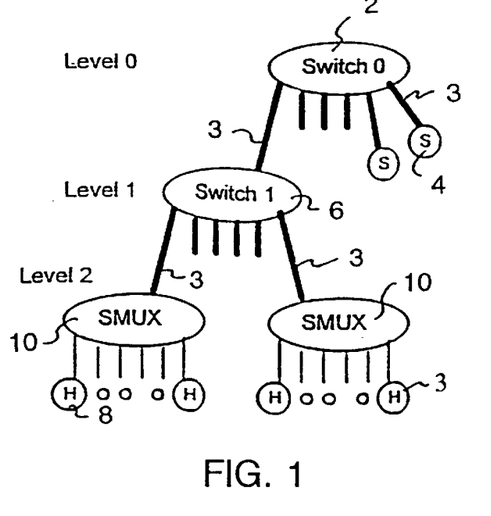
FIG. 1 is a schematic representation of a hierarchial implementation using the smart multiplexing device according to the invention.

The hierarchial wiring structure shown in FIG. 1 includes several different levels to provide a fanning out of a network, such as a LAN, from a centralized core. The central core is at level 0 with a level 0 switch 2 connected to one or more servers 4 via a high speed Gbps line 3. The level 0 switch 2 is also connected to one of several level 1 switches 6 also via a high speed Gbps link 3. The level 1 switches 6 are at a lower level in the hierarchial scheme or at level 1 of FIG. 1 (i.e. further fanned out from the central core as compared to level 0). Each level 1 switch operates as a feeder to a further lower level or level 0 as shown in FIG. 1. The level 1 switch 6 interconnects multiple level 2 devices 10, each via a high speed Gbps line 3. The device 10 are referred to herein as a smart mux devices 10. However, as will be appreciated below, the device is not specifically a multiplexer (however it provides an aggregation of traffic and a packing of the traffic onto the high speed Gbps line 3). The devices 10 provide end users or hosts 8 with connectivity to the network. The devices 10 exist at the edge of the network and therefore have the greatest number due to the fan-out nature of the hierarchial structure as shown in FIG. 1.

Figure 2:
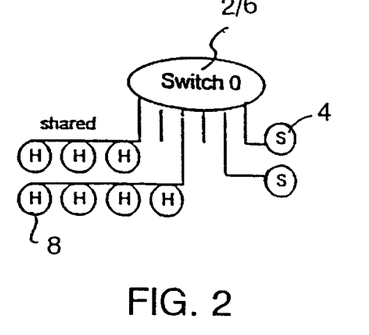
FIG. 2 is a logical model of a level 0 switch and level 1 switch used in the hierarchial implementation according to the invention.

A logical bridge model for the level 0 and level 1 switches of the hierarchial arrangement of FIG. 1 is shown in FIG. 2. As seen from the level 0 switch or level 1 switch of FIG. 2, from the vantage point of this switch (2 or 6), each port (such as first end users 8) is attached to a logically shared segment consisting of numerous end stations or hosts 8. The reality of this situation is that another switch which represents or includes those end stations is actually attached. This situation occurs with each of the level 0 and level 1 switches in the hierarchial arrangement according to the invention. The level 0 switch model must closely approximate a traditional bridge model, with peer-peer ports and distributed data flows being the norm. Here the level 1 switch is more a feeder than a traditional bridge although it maintains equivalent link speeds and is not optimized for unidirectional traffic. Also, each level 1 switch 6 is attached to a logically shared segment consisting of all downstream end stations, exactly in the same way as the layer 0 switch 2.

Figure 3:
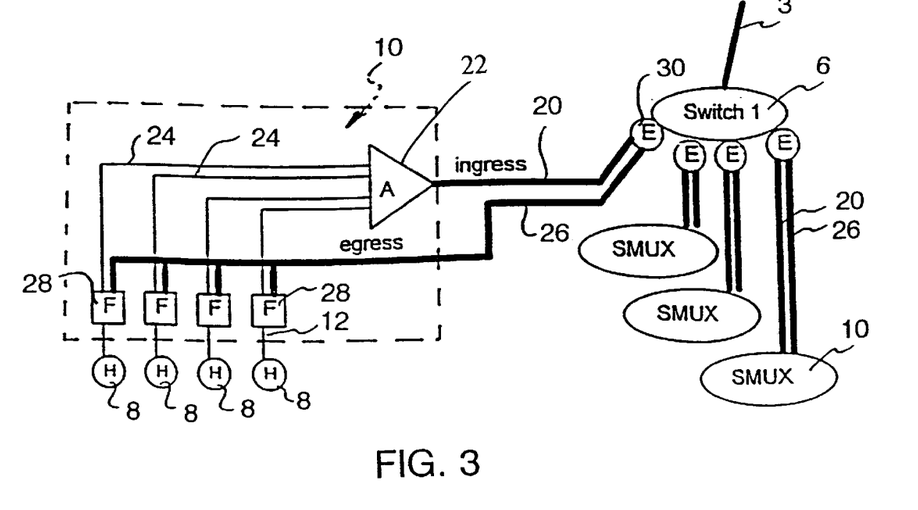
FIG. 3 is a schematic diagram showing details of the smart mux device according to the invention as connected to a level 1 switch and showing a connection of other smart multiplexing devices to such a level 1 switch.

FIG. 3 shows details as to the features of the smart multiplexing device 10 according to the invention, as a schematic view. Each smart multiplexing device 10 includes a plurality of ports 12. These ports 12 are connected on an ingress side (packet flow to the higher layer switch, such as to level 1 switch 6) to a high speed trunk (such as a Gbps trunk 20 via arbiter/aggregator means 22). Various individual ports are individually connected to the arbiter/aggregator means 22 via individual lines 24 such as a 10/100 Mbps link. The arbiter/aggregator device 22 retrieves inbound traffic (data packets etc.) from each device port 12 and packs this traffic onto the high speed trunk 20 for the next layer switch such as layer 1 switch 6. In the egress direction (the flow of packets or traffic from the higher level switch toward the individual ports) a high speed trunk 26 extends from the next layer switch (such as level 1 switch 6) down to each port media access controller or MAC (see FIG. 4). The preferred implementation of the invention includes the provision of trunks 20 and 26 as part of a single full duplex link 120. Each port includes filter means 28 for filtering or forwarding traffic based on the attached station address.

Associated with the smart mux device 10, possibly at the port of the next level switch (such as level 1 switch 6), there is provided local echo back means 30 which sends back traffic (sends back packets). In this way, traffic which is destined to be local to the segment returns to the ports wherein each port filters or forwards the returning traffic (returning packets). This allows peer-peer traffic with the local echo back means 30. The echo back means 30 may also be provided as part of the smart mux device 10.

The echo element 30 sends back traffic destined to be "local" to the segment. This involves some intelligence at switch 6 (See FIGS. 3 and 10) or at the smart mux 10, if the echo element 30 is part of the smart mux 10. Normally, when a switch decides which packets should be forwarded, it eliminates the port the packet was received on from the list of possible transmit ports. The echo element 30 is provided such that the switch 6 keeps the received port (all traffic from smart mux 10) as a possible transmit port. In this way only packets that need to be echoed back are sent back.

Figure 4:
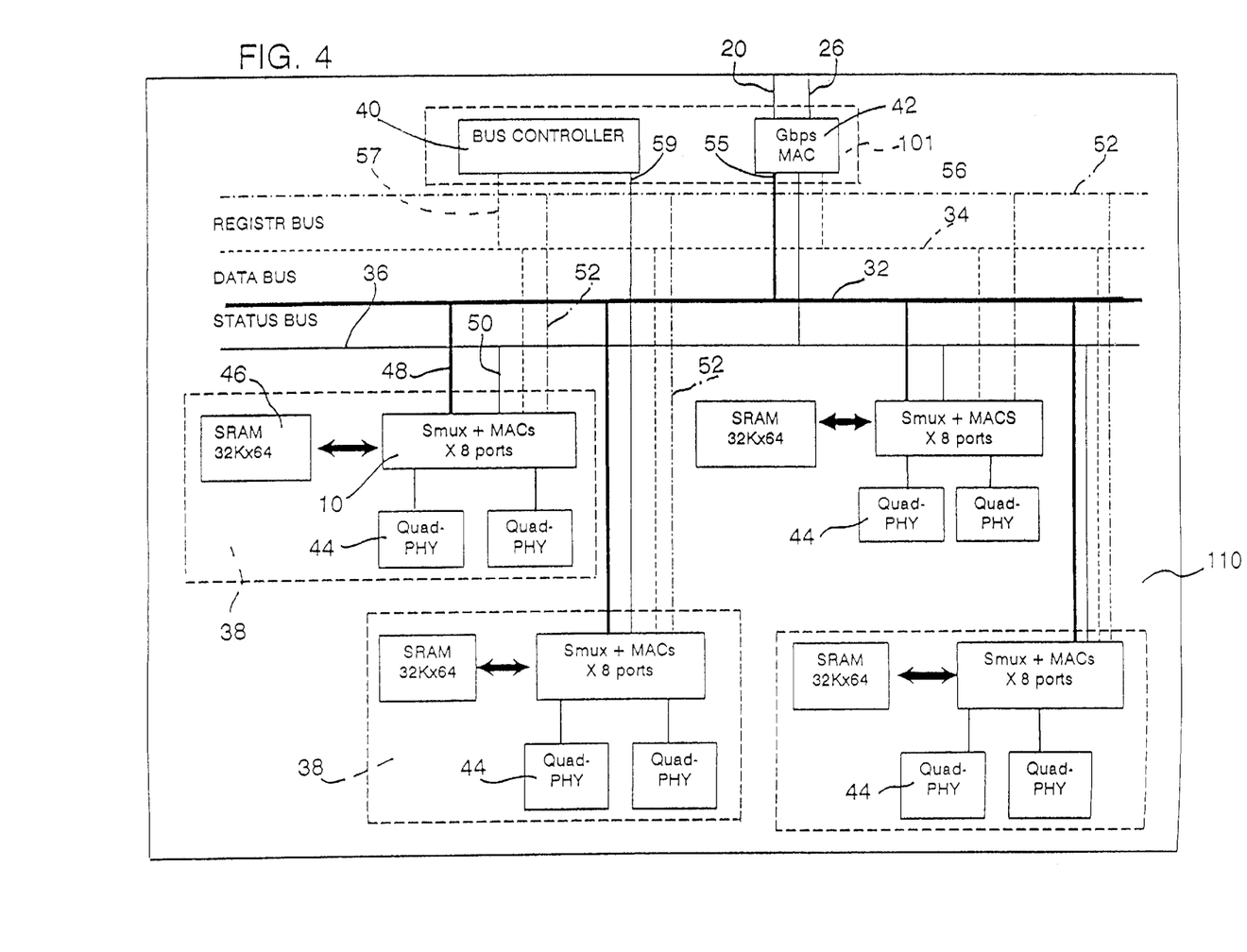
FIG. 4 is a block diagram view showing several smart multiplexing devices as part of a line cared in a line card block diagram.
Figure 5:
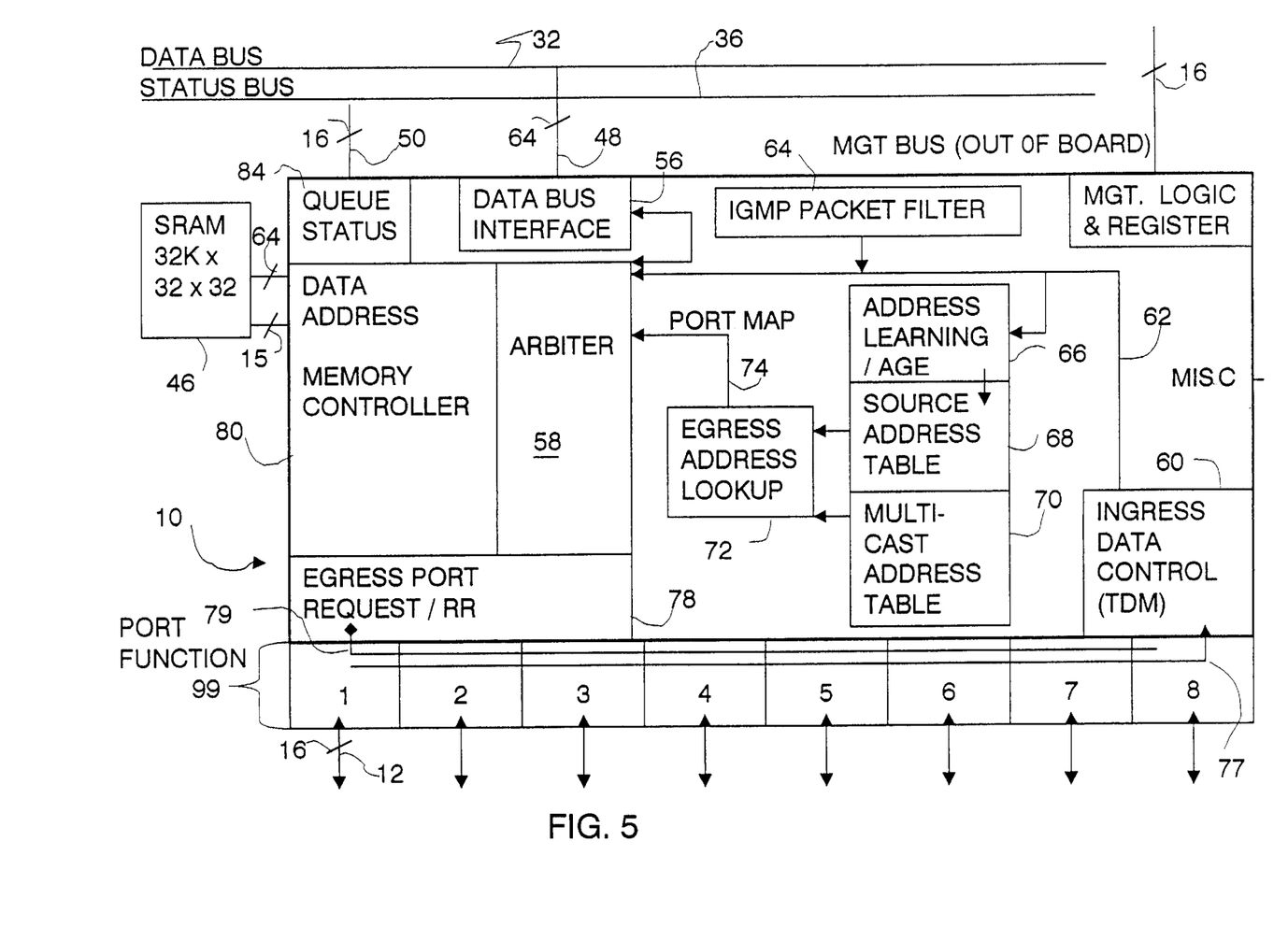
FIG. 5 is a block diagram showing a layout for a application specific integrated circuit (ASIC) forming the smart multiplexing device of the invention.

FIG. 3 shows a board with the smart mux 10 in a dashed lines. FIG. 4 shows a detailed picture of the smart mux board 110 according to the invention. This board 110 includes several smart mux devices 10. FIG. 5 shows the details of the smart mux device and SRAM configuration 38, but without the Quad-Phy 44.

The device of the invention may be provided in various versions. A main chassis may be provided with a backplane. A switch card (a circuit board connected to the backplane via a slot connection) may be provided as switch 6 and a switch 2 may also be connected to a slot of the chassis or connected via a link to another physical unit. The smart mux device 10 may be provided on a line card alone or in combination with other smart mux devices. The switch 6 may be a stackable device and the smart mux device 10 may also be a stackable device, connected to the switch via an appropriate link. The data trunks 20 and 26 may be seperate links or this trunk means may be a single duplex link or a half duplex link. The links may be one or more seperate physical wires (in the case of a stackable arrangement) or the link may be provided as part of a high speed hub (Gbps backplane of a hub or concentrator). A central or common processor may be provided as part of the switch 6 or processors may be provided associated with each smart mux device 10 or a common processor may be provided on a board (line card) shared by several smart mux devices.

As shown in FIGS. 4 through 10, the concepts of the smart multiplexing device 10, can be implemented as several smart mux devices 10 on a board (line card) 110 which has a data bus or a high speed bus (Gbps) 32 as shown in FIG. 4. The board 110 preferably also includes a register bus 34, a status bus 36 and a management bus 52. These buses 32, 34, 36 and 52 are connected to one or more chips forming each smart mux 10. The data bus 32 may also be connected, via a Gbps MAC (media access controller) 42 to a level 1 switch 6 which in turn is connected to level 0 switch 2. A bus controller 40 is provided for controlling transfers on the data bus 32 between Gbps MAC 42 and smart mux devices 10. This bus controller 40 is also connected to the status bus 36. The Gbps MAC 42 is connected to each of the register bus 34, the status bus 36 and the high speed bus or data bus 32.

The bus controller 40 provides control of data transfer between bus 32 and Gbps MAC 42 and the smart mux devices 10. The controller 40 uses the status bus 36 to determine if there are packets to be sent on the Gbps up link and schedules the transfer of these packets to the Gbps MAC 42 over the data bus 32. When packets are received by the Gbps MAC 42 these packets are scheduled to be transferred to the smart mux devices over the data bus 32.

Each group of eight (8) port devices 99 is provided as part of a chip or assembly 38 which includes the smart mux unit 10. This smart mux unit 10 may be provided in combination with the Gbps media access controller. The smart mux devices 10 preferably each include 8 port devices 99 which are in turn provided with connections to 2 quad physical (Quad Phy) port elements 44. Each smart mux device 10 is also connected to SRAM 46 such as 32K×64 SRAM to form the assembly 38. FIG. 4 shows several smart mux devices 10 and several assemblies 38 on a board 110.

FIG. 5 shows a preferred ASIC layout for a smart mux device 10 according to the invention. As can be seen in the layout diagram of FIG. 5, the ASIC for the smart mux device 10 has a common input/output for 64 bit connection 48 as well as connection 50 to status bus 36 (this may be for example 16 bit) and the management bus connection 52.

The smart mux device 10 is provided with a data bus interface 56. This interface is connected to the data bus 32 via connection 48 for incoming and outgoing data packets. The data bus interface 56 is in turn connected to the arbiter 58, which is part of the arbiter/aggregator means 22. Various port devices 99 are provided, such as eight (8) port devices 99, in the smart mux device 10 ASIC connected to the physical ports 12. The port devices 99 include a 10 Mbps or 100 Mbps MAC device 87 (see FIG. 8). On the ingress side (data packet/traffic flowing to the next higher level—to the server) an ingress data control TDM (time division multiplexing) device 60 is connected to the various port devices 99 at ingress TDM control I.F. 77 (see FIG. 8). Data packets are moved from the ingress data control device 60 via line 62 to the arbiter 58 and then to the SRAM 46 via SRAM interface 92 into the port ingress queue (see FIG. 6).

The IGMP (Internet Group Membership Protocol) packet filter 64 monitors traffic on line 62. This is done to capture IGMP packets for the microprocessor (such as central microprocessor 600 shown in FIG. 10) to analyze. This IGMP snooping looks at IGMP control packets to establish multicast filtering. Additionally, the address learning/age device 66 monitors traffic on line 62 and interrogates source address for building a source address table 68. A multicast address table 70 is also built up (written to) by the microprocessor 600. The multicast table 70 is read by the egress address lookup device 72. The address look-up device 72 reads data from the source address table 68 and multicast address table 70 for comparison to egress traffic (namely packets coming from an upper level of the hierarchial structure, namely packets coming from the server). The results of the lookup is written as an egress port map into the egress queue (see FIG. 7) via the port map bus 74. Packets coming into the smart mux device 10 (the egress function) come in via data line 56 and connection line 48 and through arbiter 58 to SRAM 46. A memory controller 80 cooperates with SRAM 46 for controlling the flow of packets onto and off of the data bus 92. Element 84 monitors the queue status as to incoming and outgoing packets and this information is sent out on a status bus 36 via connection line 50.

Figure 6:
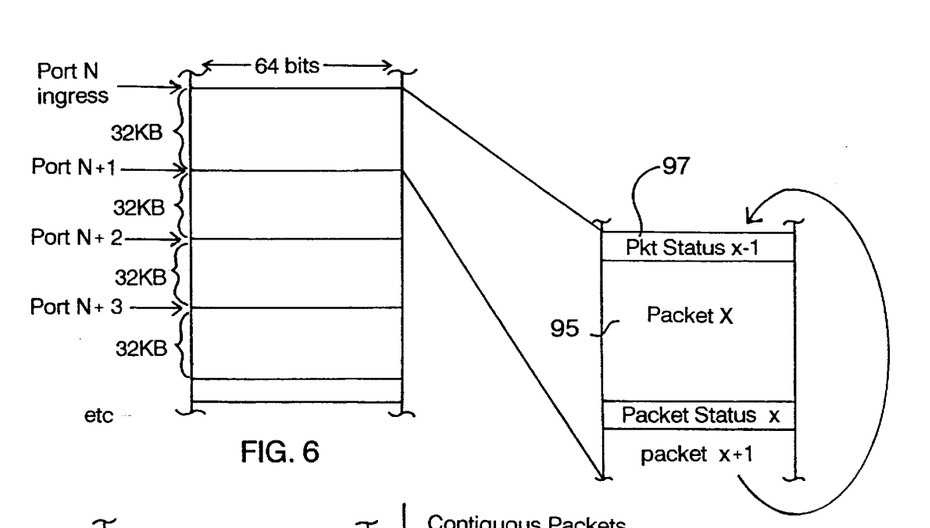
FIG. 6 is a graphical showing of a SRAM ingress queue per port.

FIG. 6 shows the per-port SRAM ingress queue. This graphical representation shows various ports such as port N, port N+1, port N+2, port N+3, etc. wherein the vertical direction of the port represents 32 KB and the horizontal extension of the graphical representation is 64 bits (corresponding to the 64 bit line 48). Packets 95 are received via the ingress data control device 60 and are passed to the ingress queue for the particular port (see FIG. 6). Packets are packed inside SRAM 46 with only packet status field 97 separating them. The packet status field 97 contains information such as packet length, good or bad packet, crc, whether a packet follows or free memory follows.

As shown on the right side of FIG. 6, the queue functions as a circular queue. A port round robin system is used for sending the data from the ingress queue.

Figure 7:
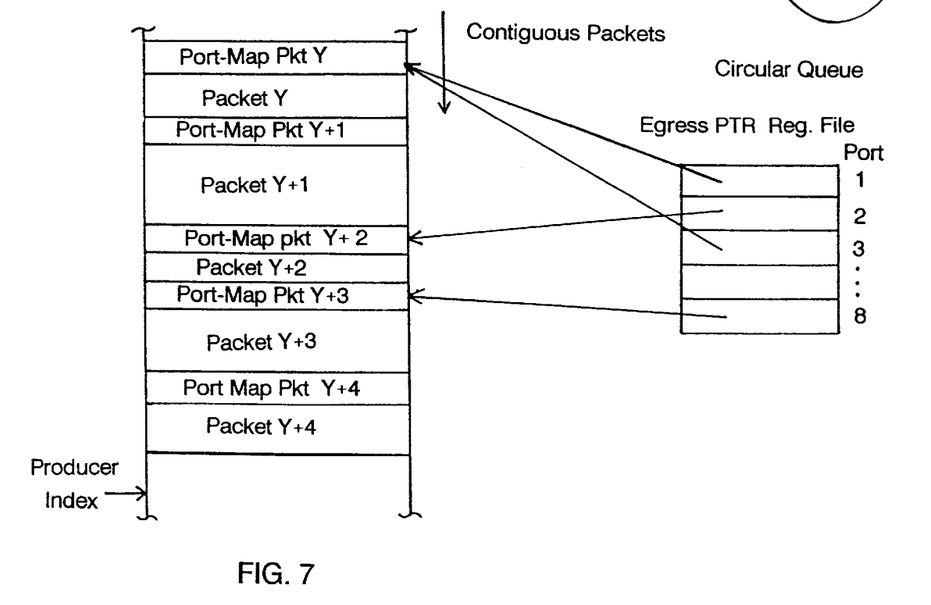
FIG. 7 is an SRAM egress queue for the common port: 256 KB.

FIG. 7 shows the egress queue. The left side of the figure shows a producer index or pointer which points to indicate where the next packet is to be taken from or written to. The vertical direction of the left side of the figure shows continuous packets, such as packet Y, packet Y+1, packet Y+3, etc. with inspersed port map data such as port map packet Y, port map packet Y+1, port map packet Y+2, etc. Each port independently follows the master egress queue, accepting packets based on the port map. The port map indicates the ports or port of the eight ports the particular packet is to be sent to.

Figure 8:
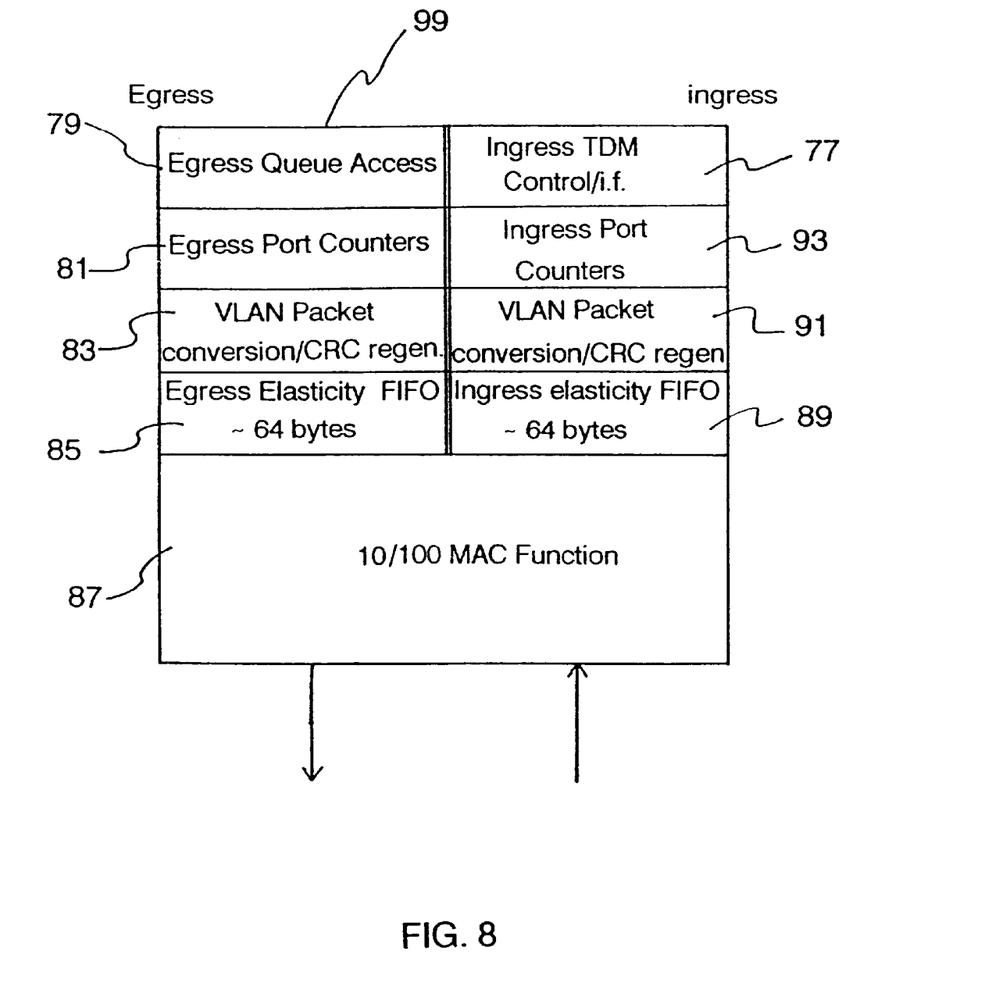
FIG. 8 is a graphical representation of port egress and ingress functions supported per client port.

FIG. 8 is a view for explaining the function of a single port device 99 of the port devices 99 one through eight shown in FIG. 5. Each port device 99 provides egress queue access 79 (see also FIG. 5) as well as egress port counters 81. A VLAN (virtual local area network) packet conversion/CRC (cylindrical redundancy check) regeneration function 83 (IEEE 802.1Q) is also provided. The port device also has egress elasticity such as a first in first out (FIFO) 64 bytes memory. Similarly, on the ingress side the port device 99 includes an ingress TDM (time division multiplexing) control/i.f 77. This interface provides control as to the ingress queue. An ingress elasticity FIFO memory 89 of about 64 bytes is also provided. A VLAN packet conversion/CRC regeneration device 91 is provided and ingress port counters 93 are provided as well. The port device 99 also provides the 10 Mbps or 100 Mbps MAC function 87.

Figure 9:
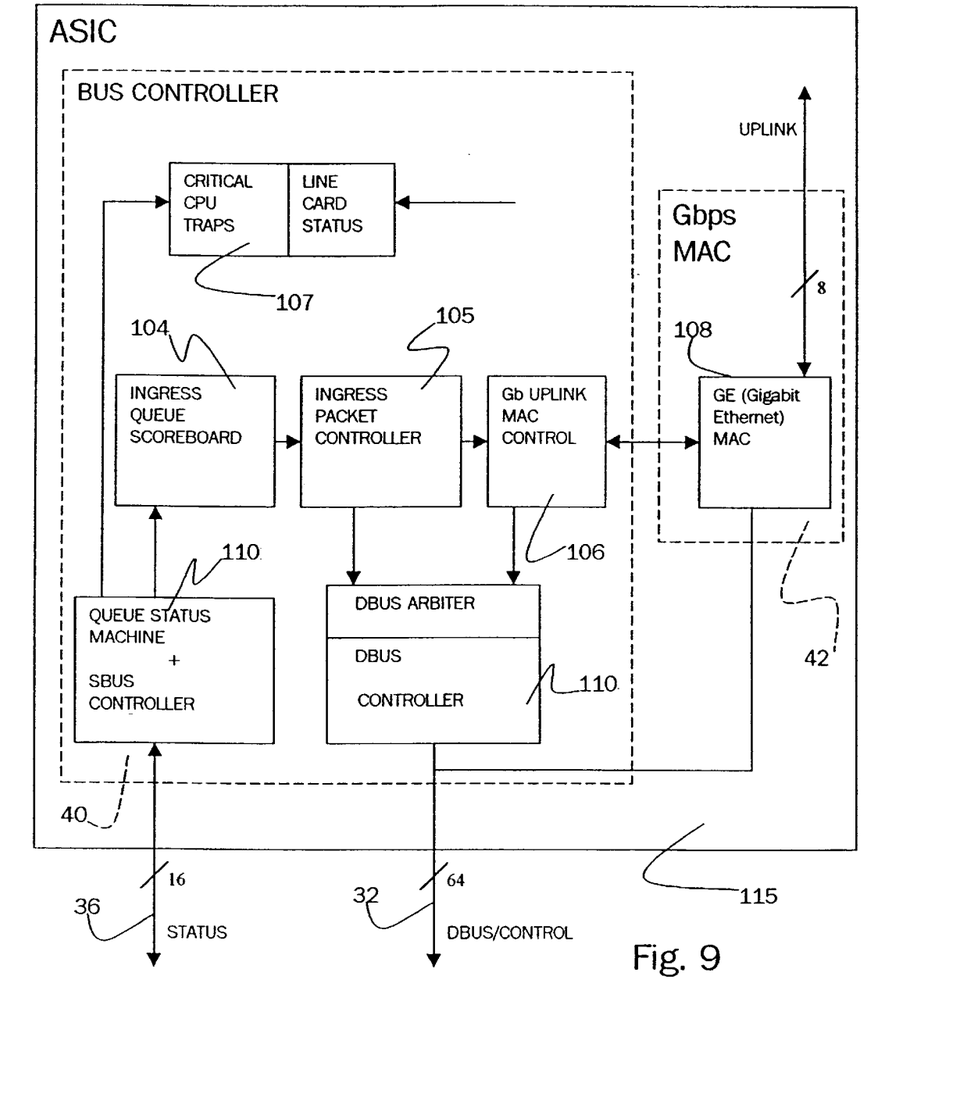
FIG. 9 is a circuit diagram of a central control application specific integrated circuit (ASIC) for use with the smart multiplexing device of the invention.

FIG. 9 shows a central control ASIC 115 which is provided with the bus controller 40 and Gbps MAC 42. Further aspects of the implementation of bus controller 40 and Gbps MAC 42 are shown in FIG. 4.

The bus controller 40 includes data bus (DBus) controller/arbiter 103 which receives indications of databus transfer requests from the Gb up link MAC control device 106 and ingress packet controller 105. The DBus arbiter/DBus controller 103 initiates data transfers between the Gbps MAC 42 in the smart mux device 10 over data line 32.

The Gbps up link MAC control device 106 receives an indication of a packet being received from the GE (Gigabit Ethernet) Mac 108 of Gbps MAC 42. Control device 106 passes this request to the data bus controller/arbiter 103. The ingress packet controller 105 receives an indication of which smart mux device 10 should be serviced next from the ingress queue scoreboard 104. The ingress queue scoreboard 104 keeps track of which ingress ports have packets to transfer to the Gbps up link, which ingress ports have been serviced recently and determines which ingress port should be serviced next. The queue status machine and Sbus controller 102 poles the smart mux device 10 via the status bus 36 at queue status device 84 to see which ingress ports have received packets. This information is passed along to both critical CPU traps 107 and ingress queue scorecard 104. The inband management decipher logic 109 of the Gbps MAC 42 receives management requests sent from level 1 switch 6 over the Gps up link and performs the requested read or write operation to smart mux devices 10 over the registered bus 34. Along with the central CPU traps 107 there is provided a line card status device. The central CPU 600 reads line card status and counters to provide the status and counters to management.

Figure 10:
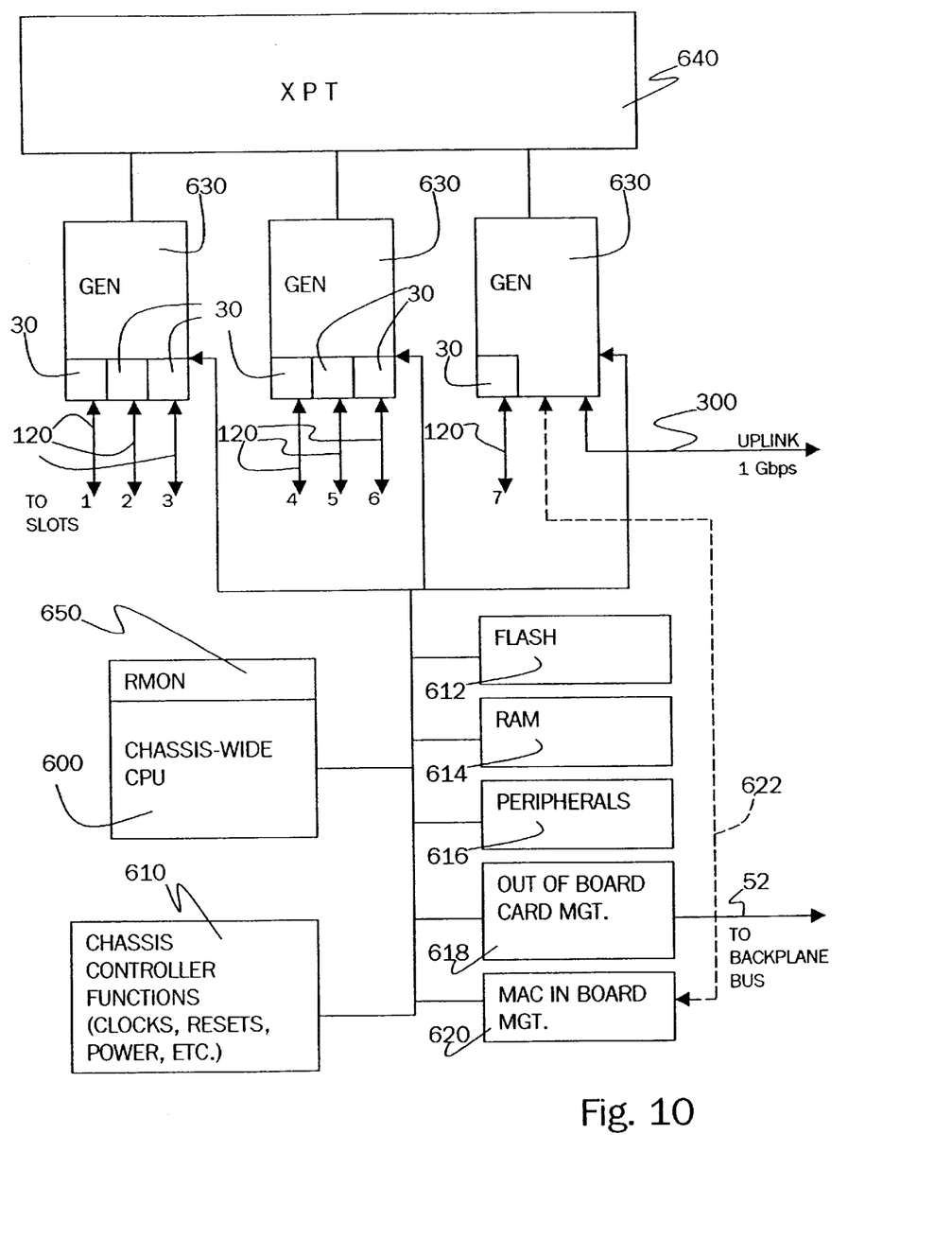
FIG. 10 is a circuit diagram showing the switching fabric for the hierarchial arrangement using smart multiplexing devices according to the invention

FIG. 10 is a circuit diagram showing the switch fabric of the switch 6 connected to the various line cards which include the various smart multiplexing devices 10. The central switch 6 is shown connected to 7 smart mux device line cards 110 (the card is shown in FIG. 4) via the Gbps links 120. The connection may be via a backplane (part of a chassis connected also to the switch 6) of a device which is star wired providing the full duplex ethernet links 20 and 26 shown in FIG. 3.

The switch 6 as shown in FIG. 10 includes a chassis wide CPU such as a 6801/0 processor or a power PC 603 processor 600. The switch also includes a chassis controller 610 which provides clocks, resets, power, etc. The chassis wide CPU 600 and the chassis controller 610 are connected to flash memory 612, random access memory (RAM) 614, peripherals 616, out of board line card management device 618 as well as MAC in board management device 620. The chassis wide CPU 600 and chassis controller 610 are also connected to each of three port devices GEN (Gigabit Ethernet Network controller) 630 as well as switch device 640. Each GEN device 630 is connected to a cross point switch (XPT) 640. Each of the GEN devices 630 are connected to one of the various Gbps links 120, namely to slots connected to the various line cards 110. One of the GEN devices 630 is also connected to the MAC in board management device 620 via line 622. Further, one of the GEN devices 630 is connected to the Gbps up link 300.

The switch 6 also includes RMon (remote monitoring) device 650 which may be for example RMon 1 or RMon 2. The RMon device 650 advantageously provides observability on all client switching ports (ports of the various smart mux devices 10). This is a significant advantage of the invention due to all traffic from the ports 12 of the smart mux devices 10 being uplinked or packed on the link 3 (trunk 20).

The central switch 6 acts like a normal switch with the addition of the echo back feature. The out of band management card 618 communicates with the smart mux line card 110 via the backplane management bus 52 (see FIG. 5).

While specific embodiments of the invention have been shown and described in detail to illustrate the application of the principles of the invention, it will be understood that the invention may be embodied otherwise without departing from such principles.

What is claimed is:

1. A network packet forwarding device, comprising:

a plurality of end user ports for connection to end users;

an input/output trunk connected to said plurality of end user ports;

an arbiter/aggregator connected to said input/output trunk and connected to said end user ports for aggregating data packets from said ports and packing aggregated data packets onto said trunk independent of destination information contained in the data packets from said ports, said input/output trunk includes an ingress trunk connected to said aggregator for receiving said aggregated data packets flowing from said ports and an egress trunk for packets flowing to said ports, and said trunk being configured as one of:

a full duplex link and a half duplex link;

a filter provided between said ports and said trunk for filtering or forwarding data packets from said trunk to associated said ports based on destination information contained in the data packets from said trunk;

an echo device at said one of said switch ports for echoing packets from said ingress trunk onto said egress trunk; and a switch including a plurality of switch ports with a switch input/output, said trunk being connected via said echo device to one of said switch ports.

2. A device according to claim 1, wherein said trunk, said arbiter/aggregator, said ports and said filter means form a packet forwarding device as part of a hierarchial network implementation, said hierarchial network implementation including:

said switch with a plurality of switch ports and an uplink input/output device, said trunk being connected to one of said switch ports and echo device at said one of said switch ports for echoing packets from said ingress trunk onto said egress trunk.

3. A device according to claim 2, further comprising monitoring means associated with said switch for monitoring all traffic on said trunk whereby said hierarchial network implementation provides observability on all devices connected to said packet forwarding device.

4. A device according to claim 2, further comprising: another switch including a plurality of ports including another switch port connected to said uplink input/output device and another switch port connected to a network server.

5. A device according to claim 1, wherein said arbiter/aggregator includes:

ingress queue means for receiving packets from said ports and storing said packets in a memory queue and sending said packets on said ingress trunk.

6. A device according to claim 1, wherein information contained in the data packets from said trunk includes one or more of destination addresses, source address, layer 3 header information and protocol type.

7. A method of transferring data in a hierarchial network implementation, comprising the steps of:

providing a plurality of end user ports connected to end users;

providing an input/output trunk connected to said plurality of end user ports, said input/output trunk including an ingress trunk and an egress trunk;

aggregating data packets, with an arbiter/aggregator, from said end user ports and packing aggregated data packets onto said trunk independent of destination addresses of the data packets from said end user ports;

filtering incoming data packets or forwarding incoming data packets on said trunk to said end user ports, based on destination addresses of the data packets on said trunk, said end user ports and said filtering in a packet forwarding device as part of said hierarchial network implementation;

providing an echo device for echoing packets from said ingress trunk onto said egress trunk based on the destination address of the packets; and providing a switch with a plurality of intermediate switch ports and an uplink input/output device, said trunk being connected to one of said intermediate switch ports via said echo device.

8. A method according to claim 7, further comprising monitoring traffic on said trunk whereby said hierarchial network implementation provides observability on all devices connected to said packet forwarding device.

9. A method according to claim 7, further comprising: providing another switch including a plurality of switch ports including a switch port connected to said uplink input/output device and a switch port connected to a network server.

10. The method according to claim 1, wherein said arbiter/aggregator establishes an ingress queue for receiving packets from said ports and storing said packets in a memory queue and sending said packets on said ingress trunk to said switch.

* * * * *